United States Patent
Gass et al.

(10) Patent No.: US 6,813,983 B2
(45) Date of Patent: Nov. 9, 2004

(54) POWER SAW WITH IMPROVED SAFETY SYSTEM

(75) Inventors: Stephen F. Gass, Wilsonville, OR (US); David A. Fanning, Vancouver, WA (US)

(73) Assignee: SD3, LLC, Wilsonville, OR (US)

(*) Notice: Subject to any disclaimer, the term of this patent is extended or adjusted under 35 U.S.C. 154(b) by 258 days.

(21) Appl. No.: 10/052,273

(22) Filed: Jan. 16, 2002

(65) Prior Publication Data

US 2002/0059853 A1 May 23, 2002

Related U.S. Application Data

(63) Continuation-in-part of application No. 09/676,190, filed on Sep. 29, 2000, and a continuation-in-part of application No. 09/929,221, filed on Aug. 13, 2001, and a continuation-in-part of application No. 09/929,226, filed on Aug. 13, 2001, and a continuation-in-part of application No. 09/929,227, filed on Aug. 13, 2001, and a continuation-in-part of application No. 09/929,234, filed on Aug. 13, 2001, and a continuation-in-part of application No. 09/929,235, filed on Aug. 13, 2001, and a continuation-in-part of application No. 09/929,236, filed on Aug. 13, 2001, and a continuation-in-part of application No. 09/929,237, filed on Aug. 13, 2001, and a continuation-in-part of application No. 09/929,238, filed on Aug. 13, 2001, and a continuation-in-part of application No. 09/929,240, filed on Aug. 13, 2001, and a continuation-in-part of application No. 09/929,241, filed on Aug. 13, 2001, and a continuation-in-part of application No. 09/929,242, filed on Aug. 13, 2001, and a continuation-in-part of application No. 09/929,244, filed on Aug. 13, 2001, and a continuation-in-part of application No. 09/929,425, filed on Aug. 13, 2001, and a continuation-in-part of application No. 09/929,426, filed on Aug. 13, 2001

(60) Provisional application No. 60/270,011, filed on Feb. 20, 2001, provisional application No. 60/270,941, filed on Feb. 22, 2001, and provisional application No. 60/270,942, filed on Feb. 22, 2001.

(51) Int. Cl.[7] ............................. B26D 5/00; B26D 1/14; B27B 5/18

(52) U.S. Cl. ................... 83/62.1; 83/58; 83/DIG. 1; 83/471.3; 83/477.1; 83/490; 83/589; 83/581; 192/192 R; 192/138; 337/10; 74/814; 307/326; 340/590

(58) Field of Search ................. 83/397, 397.1, 83/471.2, 473, 471.3, 477, 477.1, 490, DIG. 1, 486, 485, 589, 581, 491, 58, 62.1; 56/10.4, 11.3; 144/154.5, 356, 384, 391, 427, 286.5; 74/2, 814; 188/82.7, 82.8, 82.74, 82.77, 376, 377; 30/382, 381; 318/362; 307/142, 115, 117, 126, 131, 326; 340/680, 562, 686.5, 825.23, 590; 361/1, 124; 337/1, 10, 5, 17, 70, 140, 148, 170; 403/2; 173/2; 192/192 R

(56) References Cited

U.S. PATENT DOCUMENTS

| 941,726 A | 11/1909 | Pfalzgraf |
| 1,205,246 A | 11/1916 | Mowry |

(List continued on next page.)

FOREIGN PATENT DOCUMENTS

| CH | 297525 | 6/1954 |
| DE | 76186 | 8/1921 |

(List continued on next page.)

OTHER PUBLICATIONS

Gordon Engineering Corp., Product Catalog, Oct. 1997, pp. cover, 1, 3 and back, Brookfield, Connecticut, US.

Primary Examiner—Boyer D. Ashley

(57) ABSTRACT

A miter saw having a base and an arm that pivots toward the base is disclosed. A blade is supported by the arm, and is designed to cut workpieces resting on the base when the arm and blade pivot downward. The saw includes a detection system configured to detect one or more dangerous conditions between a person and the blade, such as when a person accidentally touches the spinning blade, and the saw includes a reaction system to urge the arm and blade away from the base when the dangerous condition is detected.

20 Claims, 10 Drawing Sheets

U.S. PATENT DOCUMENTS

| | | |
|---|---|---|
| 1,551,900 A | 9/1925 | Morrow |
| 1,807,120 A * | 5/1931 | Lewis ................. 83/471.2 |
| 1,811,066 A | 6/1931 | Tannewitz |
| 1,896,924 A | 2/1933 | Ulrich |
| 1,902,270 A | 3/1933 | Tate |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 2,007,887 A | 7/1935 | Tautz |
| 2,020,222 A | 11/1935 | Tautz |
| 2,038,810 A | 4/1936 | Tautz |
| 2,106,288 A | 1/1938 | Tautz |
| 2,163,320 A | 6/1939 | Hammond |
| 2,241,556 A | 5/1941 | MacMillin et al. |
| 2,286,589 A | 6/1942 | Tannewitz |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,425,331 A | 8/1947 | Kramer |
| 2,434,174 A | 1/1948 | Morgan |
| 2,466,325 A | 4/1949 | Ocenasek |
| 2,496,613 A | 2/1950 | Woodward |
| 2,509,813 A | 5/1950 | Dineen |
| 2,517,649 A | 8/1950 | Frechtmann |
| 2,572,326 A | 10/1951 | Evans |
| 2,593,596 A | 4/1952 | Olson |
| 2,623,555 A | 12/1952 | Eschenburg |
| 2,661,780 A | 12/1953 | Morgan |
| 2,675,707 A | 4/1954 | Brown |
| 2,690,084 A | 9/1954 | Van Dam |
| 2,722,246 A | 11/1955 | Arnoldy |
| 2,731,049 A | 1/1956 | Akin |
| 2,736,348 A | 2/1956 | Nelson |
| 2,785,710 A | 3/1957 | Mowery, Jr. |
| 2,786,496 A | 3/1957 | Eschenburg |
| 2,954,118 A | 9/1960 | Anderson |
| 2,978,084 A | 4/1961 | Vilkaitis |
| 2,984,268 A | 5/1961 | Vuichard |
| 3,011,610 A | 12/1961 | Stiebel et al. |
| 3,047,116 A | 7/1962 | Stiebel et al. |
| 3,129,731 A | 4/1964 | Tyrrell |
| 3,163,732 A | 12/1964 | Abbott |
| 3,186,256 A | 6/1965 | Reznick |
| 3,207,273 A | 9/1965 | Jurin |
| 3,224,474 A | 12/1965 | Bloom |
| 3,323,814 A | 6/1967 | Phillips |
| 3,386,322 A | 6/1968 | Stone et al. |
| 3,454,286 A | 7/1969 | Anderson et al. |
| 3,540,338 A * | 11/1970 | Bushman et al. ............ 83/490 |
| 3,554,067 A | 1/1971 | Scutella |
| 3,580,609 A | 5/1971 | Menge |
| 3,581,784 A | 6/1971 | Warrick |
| 3,613,748 A | 10/1971 | De Pue |
| 3,675,444 A | 7/1972 | Whipple |
| 3,680,609 A * | 8/1972 | Menge ................. 83/471.2 |
| 3,695,116 A | 10/1972 | Baur |
| 3,745,546 A | 7/1973 | Struger et al. |
| 3,749,933 A | 7/1973 | Davidson |
| 3,772,590 A | 11/1973 | Mikulecky et al. |
| 3,785,230 A | 1/1974 | Lokey |
| 3,829,850 A | 8/1974 | Guetersloh |
| 3,858,095 A | 12/1974 | Friemann et al. |
| 3,861,016 A | 1/1975 | Johnson et al. |
| 3,922,785 A | 12/1975 | Fushiya |
| 3,924,688 A | 12/1975 | Cooper et al. |
| 3,931,727 A | 1/1976 | Luenser |
| 3,946,631 A | 3/1976 | Malm |
| 3,947,734 A | 3/1976 | Fyler |
| 3,953,770 A | 4/1976 | Hayashi |
| 3,967,161 A | 6/1976 | Lichtblau |
| 4,007,679 A | 2/1977 | Edwards |
| 4,026,177 A | 5/1977 | Lokey |
| 4,047,156 A | 9/1977 | Atkins |
| 4,060,160 A | 11/1977 | Lieber |
| 4,070,940 A | 1/1978 | McDaniel et al. |
| 4,075,961 A | 2/1978 | Harris |
| 4,077,161 A | 3/1978 | Wyle et al. |
| 4,085,303 A | 4/1978 | McIntyre et al. |
| 4,090,345 A * | 5/1978 | Harkness ................. 56/10.5 |
| 4,091,698 A | 5/1978 | Obear et al. |
| 4,117,752 A | 10/1978 | Yoneda |
| 4,145,940 A * | 3/1979 | Woloveke et al. ............ 83/68 |
| 4,152,833 A | 5/1979 | Phillips |
| 4,161,649 A | 7/1979 | Klos et al. |
| 4,175,452 A | 11/1979 | Idel |
| 4,190,000 A | 2/1980 | Shaull et al. |
| 4,195,722 A | 4/1980 | Anderson et al. |
| 4,249,117 A | 2/1981 | Leukhardt et al. |
| 4,249,442 A | 2/1981 | Fittery |
| 4,267,914 A | 5/1981 | Saar |
| 4,270,427 A | 6/1981 | Colberg et al. |
| 4,276,799 A | 7/1981 | Muehling |
| 4,305,442 A | 12/1981 | Currie |
| 4,321,841 A | 3/1982 | Felix |
| 4,372,202 A | 2/1983 | Cameron |
| 4,391,358 A | 7/1983 | Haeger |
| 4,466,233 A * | 8/1984 | Thesman ................. 56/11.3 |
| 4,470,046 A | 9/1984 | Betsill |
| 4,510,489 A | 4/1985 | Anderson, III et al. |
| 4,512,224 A | 4/1985 | Terauchi |
| 4,518,043 A | 5/1985 | Anderson et al. |
| 4,532,501 A | 7/1985 | Hoffman |
| 4,532,844 A | 8/1985 | Chang et al. |
| 4,560,033 A * | 12/1985 | DeWoody et al. ......... 188/2 F |
| 4,566,512 A | 1/1986 | Wilson |
| 4,573,556 A | 3/1986 | Andreasson |
| 4,589,047 A | 5/1986 | Gaus et al. |
| 4,599,597 A | 7/1986 | Rotbart |
| 4,599,927 A | 7/1986 | Eccardt et al. |
| 4,606,251 A | 8/1986 | Boileau |
| 4,621,300 A | 11/1986 | Summerer |
| 4,637,289 A | 1/1987 | Ramsden |
| 4,722,021 A | 1/1988 | Hornung et al. |
| 4,751,603 A | 6/1988 | Kwan |
| 4,757,881 A | 7/1988 | Jonsson et al. |
| 4,792,965 A | 12/1988 | Morgan |
| 4,805,504 A | 2/1989 | Fushiya et al. |
| 4,840,135 A | 6/1989 | Yamauchi |
| 4,864,455 A | 9/1989 | Shimomura et al. |
| 4,906,962 A | 3/1990 | Duimstra |
| 4,965,909 A | 10/1990 | McCullough et al. |
| 5,025,175 A | 6/1991 | Dubois, III |
| 5,046,426 A | 9/1991 | Julien et al. |
| 5,052,255 A | 10/1991 | Gaines |
| 5,081,406 A | 1/1992 | Hughes et al. |
| 5,082,316 A * | 1/1992 | Wardlaw ................. 292/201 |
| 5,086,890 A | 2/1992 | Turczyn et al. |
| 5,119,555 A | 6/1992 | Johnson |
| 5,122,091 A | 6/1992 | Townsend |
| 5,184,535 A | 2/1993 | Kimura |
| 5,198,702 A | 3/1993 | McCullough et al. |
| 5,201,684 A | 4/1993 | DeBois, III |
| 5,207,253 A | 5/1993 | Hoshino et al. |
| 5,212,621 A | 5/1993 | Panter |
| 5,218,189 A | 6/1993 | Hutchison |
| 5,245,879 A * | 9/1993 | McKeon ................. 74/2 |
| 5,257,570 A * | 11/1993 | Shiotani et al. ............ 83/471.3 |
| 5,265,510 A * | 11/1993 | Hoyer-Ellefsen ........... 83/471.3 |
| 5,272,946 A | 12/1993 | McCullough et al. |

| | | | |
|---|---|---|---|
| 5,276,431 A | 1/1994 | Piccoli et al. | |
| 5,285,708 A * | 2/1994 | Bosten et al. | 83/520 |
| 5,320,382 A | 6/1994 | Goldstein et al. | |
| 5,321,230 A | 6/1994 | Shanklin et al. | |
| 5,331,875 A | 7/1994 | Mayfield | |
| 5,377,554 A | 1/1995 | Reulein et al. | |
| 5,377,571 A | 1/1995 | Josephs | |
| 5,392,678 A | 2/1995 | Sasaki et al. | |
| 5,471,888 A | 12/1995 | McCormick | |
| 5,510,685 A | 4/1996 | Grasselli | |
| 5,513,548 A * | 5/1996 | Garuglieri | 83/397 |
| 5,534,836 A | 7/1996 | Schenkel et al. | |
| 5,606,889 A | 3/1997 | Bielinski et al. | |
| 5,667,152 A | 9/1997 | Mooring | |
| 5,671,633 A | 9/1997 | Wagner | |
| 5,695,306 A | 12/1997 | Nygren, Jr. | |
| 5,724,875 A | 3/1998 | Meredith et al. | |
| 5,730,165 A | 3/1998 | Philipp | |
| 5,755,148 A | 5/1998 | Stumpf et al. | |
| 5,771,742 A | 6/1998 | Bokaie et al. | |
| 5,782,001 A * | 7/1998 | Gray | 30/391 |
| 5,787,779 A * | 8/1998 | Garuglieri | 83/397 |
| 5,791,057 A | 8/1998 | Nakamura et al. | |
| 5,791,223 A * | 8/1998 | Lanzer | 83/471.3 |
| 5,791,224 A * | 8/1998 | Suzuki et al. | 83/488 |
| 5,861,809 A | 1/1999 | Eckstein et al. | |
| 5,921,367 A | 7/1999 | Kashioka et al. | |
| 5,937,720 A * | 8/1999 | Itzov | 83/397 |
| 5,942,975 A | 8/1999 | Sorensen | |
| 5,943,932 A | 8/1999 | Sberveglieri | |
| 5,950,514 A | 9/1999 | Benedict et al. | |
| 5,963,173 A | 10/1999 | Lian et al. | |
| 6,018,284 A | 1/2000 | Rival et al. | |
| 6,037,729 A | 3/2000 | Woods et al. | |
| 6,095,092 A | 8/2000 | Chou | |
| 6,119,984 A | 9/2000 | Devine | |
| 6,133,818 A | 10/2000 | Hsieh et al. | |
| 6,148,504 A | 11/2000 | Schmidt et al. | |
| 6,244,149 B1 | 6/2001 | Ceroll et al. | |
| 6,257,061 B1 | 7/2001 | Nonoyama et al. | |
| 6,366,099 B1 | 4/2002 | Reddi | |
| 6,418,829 B1 | 7/2002 | Pilchowski | |
| 6,450,077 B1 | 9/2002 | Ceroll et al. | |
| 6,453,786 B1 | 9/2002 | Ceroll et al. | |
| 6,460,442 B2 | 10/2002 | Talesky et al. | |
| 6,479,958 B1 | 11/2002 | Thompson et al. | |
| D466,913 S | 12/2002 | Ceroll et al. | |
| D469,354 S | 1/2003 | Curtsinger | |
| 6,536,536 B1 | 3/2003 | Gass et al. | |
| 6,543,324 B2 | 4/2003 | Dils | |
| 6,546,835 B2 | 4/2003 | Wang | |
| 6,575,087 B2 | 6/2003 | Shiga et al. | |
| 6,578,856 B2 | 6/2003 | Kahle | |
| 6,595,096 B2 | 7/2003 | Ceroll et al. | |
| D478,917 S | 8/2003 | Ceroll et al. | |
| 6,601,493 B1 | 8/2003 | Crofutt | |
| 6,607,015 B1 | 8/2003 | Chen | |
| D479,538 S | 9/2003 | Welsh et al. | |
| 6,619,348 B2 | 9/2003 | Wang | |
| 6,640,683 B2 | 11/2003 | Lee | |
| 6,644,157 B2 | 11/2003 | Huang | |
| 6,647,847 B2 | 11/2003 | Hewitt et al. | |
| 2002/0017175 A1 | 2/2002 | Gass et al. | |
| 2002/0017176 A1 | 2/2002 | Gass et al. | |
| 2002/0017178 A1 | 2/2002 | Gass et al. | |
| 2002/0017179 A1 * | 2/2002 | Gass et al. | 83/58 |
| 2002/0017180 A1 | 2/2002 | Gass et al. | |
| 2002/0017181 A1 * | 2/2002 | Gass et al. | 83/58 |
| 2002/0017182 A1 | 2/2002 | Gass et al. | |
| 2002/0017183 A1 | 2/2002 | Gass et al. | |
| 2002/0017184 A1 | 2/2002 | Gass et al. | |
| 2002/0017336 A1 | 2/2002 | Gass et al. | |
| 2002/0020261 A1 | 2/2002 | Gass et al. | |
| 2002/0020262 A1 | 2/2002 | Gass et al. | |
| 2002/0020263 A1 | 2/2002 | Gass et al. | |
| 2002/0020265 A1 | 2/2002 | Gass et al. | |
| 2002/0020271 A1 | 2/2002 | Gass et al. | |
| 2002/0056348 A1 * | 5/2002 | Gass et al. | 83/62.1 |
| 2002/0056349 A1 * | 5/2002 | Gass et al. | 83/62.1 |
| 2002/0056350 A1 | 5/2002 | Gass et al. | |
| 2002/0059854 A1 | 5/2002 | Gass et al. | |
| 2002/0059855 A1 * | 5/2002 | Gass et al. | 83/62 |
| 2002/0066346 A1 * | 6/2002 | Gass et al. | 83/58 |
| 2002/0069734 A1 | 6/2002 | Gass et al. | |
| 2002/0109036 A1 | 8/2002 | Denen et al. | |
| 2002/0170399 A1 * | 11/2002 | Gass et al. | 83/62.1 |
| 2003/0005588 A1 | 1/2003 | Gass et al. | |
| 2003/0019341 A1 | 1/2003 | Gass et al. | |
| 2003/0020336 A1 | 1/2003 | Gass et al. | |
| 2003/0037651 A1 | 2/2003 | Gass et al. | |
| 2003/0056853 A1 | 3/2003 | Gass et al. | |
| 2003/0074873 A1 | 4/2003 | Freiberg et al. | |
| 2003/0089212 A1 | 5/2003 | Parks et al. | |
| 2003/0109798 A1 | 6/2003 | Kermani | |

FOREIGN PATENT DOCUMENTS

| | | | |
|---|---|---|---|
| DE | 2800403 | 7/1979 | |
| DE | 3427733 | 1/1986 | |
| DE | 3427733 A1 * | 1/1986 | B23D/45/16 |
| DE | 4235161 A1 | 5/1993 | |
| EP | 146460 | 11/1988 | |
| EP | 0362937 A2 | 4/1990 | |
| ES | 2152184 | 1/2001 | |
| FR | 2556643 | 6/1985 | |
| FR | 2570017 | 3/1986 | |
| GB | 598204 | 2/1948 | |
| GB | 2096844 | 10/1982 | |
| GB | 2142571 | 1/1985 | |
| GB | 2142571 A * | 1/1985 | B23D/45/06 |
| WO | WO 01/26064 A2 | 4/2001 | |

* cited by examiner

US 6,813,983 B2

POWER SAW WITH IMPROVED SAFETY SYSTEM

CROSS-REFERENCE TO RELATED APPLICATIONS

This application is a continuation-in-part of the following U.S. patent applications, all of which are hereby incorporated by reference: Ser. No. 09/676,190, filed Sep. 29, 2000, Ser. No. 09/929,221, filed Aug. 13, 2001, Ser. No. 09/929,226, filed Aug. 13, 2001, Ser. No. 09/929,227, filed Aug. 13, 2001, Ser. No. 09/929,234, filed Aug. 13, 2001, Ser. No. 09/929,235, filed Aug. 13, 2001, Ser. No. 09/929,236, filed Aug. 13, 2001, Ser. No. 09/929,237, filed Aug. 13, 2001, Ser. No. 09/929,238, filed Aug. 13, 2001, Ser. No. 09/929,240, filed Aug. 13, 2001, Ser. No. 09/929,241, filed Aug. 13, 2001, Ser. No. 09/929,242, filed Aug. 13, 2001, Ser. No. 09/929,244, filed Aug. 13, 2001, Ser. No. 09/929,425, filed Aug. 13, 2001, and Ser. No. 09/929,426, filed Aug. 13, 2001.

This application claims the benefit of and priority from the following U.S. Provisional Patent Applications, all of which are hereby incorporated by reference: Ser. No. 60/270,011, filed Feb. 20, 2001, Ser. No. 60/270,941, filed Feb. 22, 2001 and Ser. No. 60/270,942, filed Feb. 22, 2001.

FIELD OF THE INVENTION

The present invention relates to power saws, and more particularly to a miter saw with a high-speed safety system.

BACKGROUND AND SUMMARY OF THE INVENTION

Miter saws are a type of woodworking machinery used to cut workpieces of wood, plastic and other materials. Miter saws include a base upon which workpieces are placed and include a circular saw blade mounted on a pivot arm. A person uses a miter saw by placing a workpiece on the base beneath the upraised blade and then bringing the blade down via the pivot arm to cut the workpiece. Miter saws present a risk of injury to users because the spinning blade is often exposed when in use. Furthermore, users often use their hands to position and support workpieces beneath the blade, which increases the chance that an injury will occur.

The present invention provides a miter saw with an improved safety system that is adapted to detect the occurrence of one or more dangerous, or triggering, conditions during use of the miter saw, such as when a user's body contacts the spinning saw blade. When such a condition occurs, the safety system is actuated to limit or even prevent injury to the user. The present invention is also adaptable for use with other power saws as well.

DETAILED DESCRIPTION AND MODE OF THE INVENTION

Figure 1:
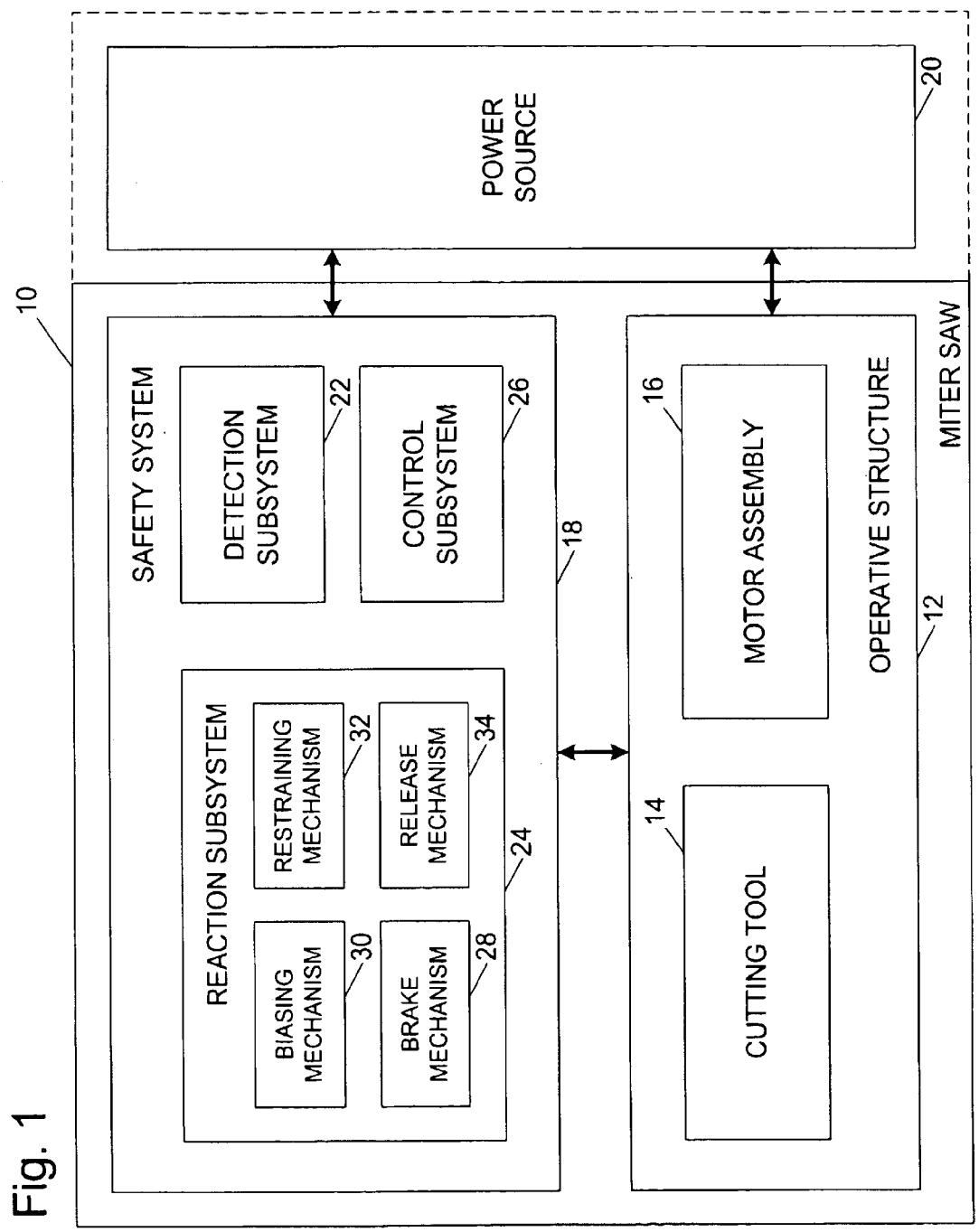
FIG. 1 is a schematic block diagram of a miter saw with a fast-acting safety system according to the present invention.

A miter saw according to the present invention is shown schematically in FIG. 1 and indicated generally at 10. Miter saw 10 may be any of a variety of different types and configurations of miter saw adapted for cutting workpieces, such as wood, plastic, etc. Miter saw 10 includes an operative structure 12 having a cutting tool 14 and a motor assembly 16 adapted to drive the cutting tool. Miter saw 10 also includes a safety system 18 configured to minimize the potential of a serious injury to a person using miter saw 10. Safety system 18 is adapted to detect the occurrence of one or more dangerous, or triggering, conditions during use of miter saw 10. If such a dangerous condition is detected, safety system 18 is adapted to engage operative structure 12 to limit any injury to the user caused by the dangerous condition.

Miter saw 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of miter saw 10.

It will be appreciated that operative structure 12 may take any one of many different forms, depending on the type of miter saw 10. As will be described in more detail below, operative structure 12 typically takes the form of an arm pivotally coupled to a base. Cutting tool 14 is mounted on the arm and pivotal toward a workpiece supported by the base. Alternatively, the arm may be both pivotally and slidably coupled to the base.

Motor assembly 16 includes one or more motors adapted to drive cutting tool 14. The motors may be either directly or indirectly coupled to the cutting tool. Typically, motor assembly 16 is mounted on the pivot arm and directly coupled to the cutting tool.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of miter saw 10. In addition, control subsystem 26 typically includes one or more instruments operable by a user to control the miter saw. The control subsystem is configured to control miter saw 10 in response to the inputs it receives.

Detection subsystem 22 is configured to detect one or more dangerous, or triggering, conditions during use of miter saw 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000 and U.S. patent application Ser. No. 09/676, 190, filed Sep. 29, 2000, the disclosures of which are herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of miter saw 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000 and U.S. patent application Ser. No. 09/929,226, filed Aug. 13, 2001, the disclosures of which are herein incorporated by reference. Retraction of the cutting tool from its operating position is described in more detail in U.S. Provisional Patent Application Ser. No. 60/225,089, filed Aug. 14, 2000 and U.S. patent application Ser. No. 09/929,242, filed Aug. 13, 2001, the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of miter saw 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
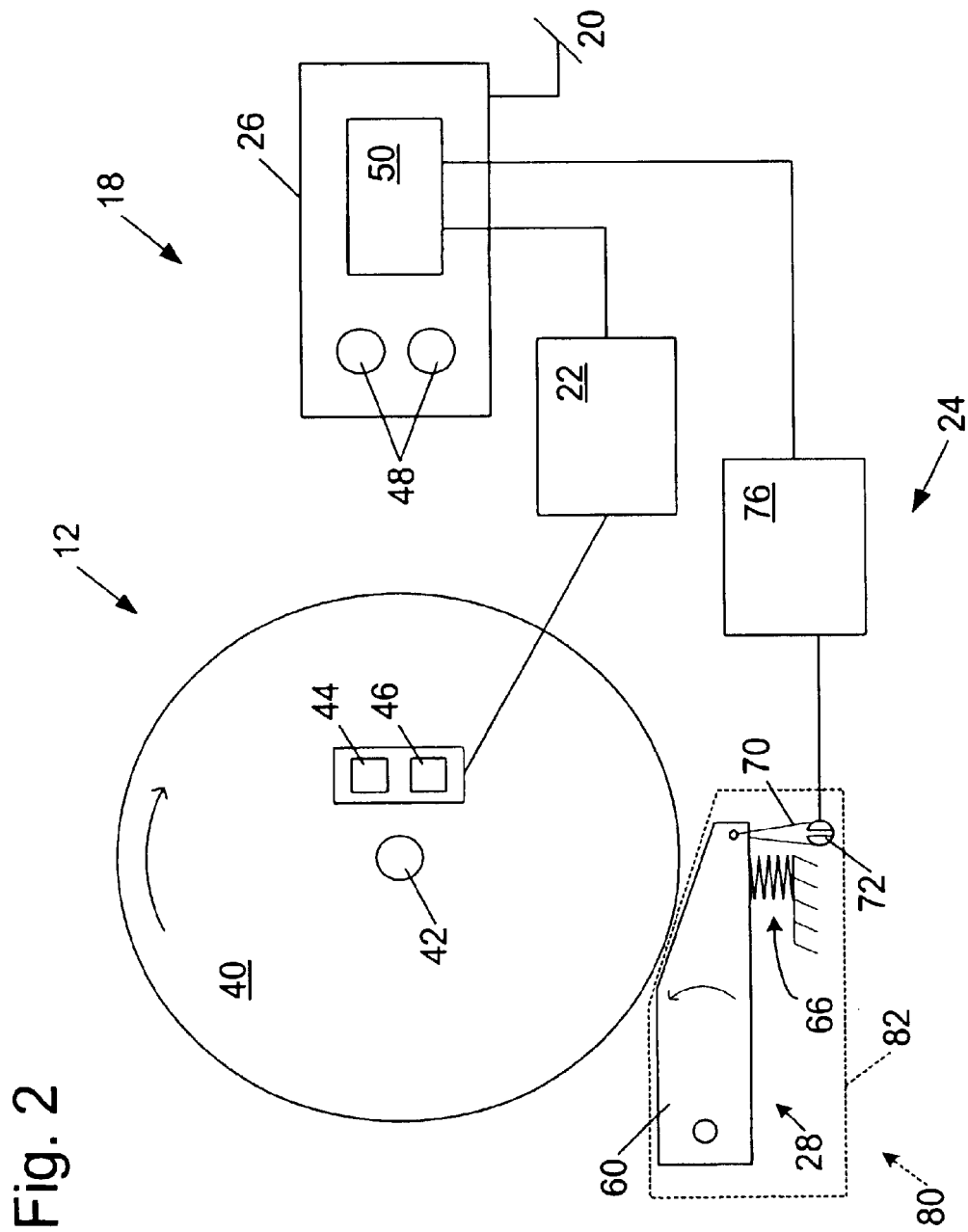
FIG. 2 is a schematic diagram of an exemplary safety system configured to stop the miter saw blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of miter saw 10 includes a cutting tool 14 in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of miter saw 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, U.S. patent application Ser. No. 09/929,426, filed Aug. 13, 2001, U.S. Provisional Patent Application Ser. No. 60/225,211, filed Aug. 14, 2000, U.S. patent application Ser. No. 09/929,221, filed Aug. 13, 2001, and U.S. Provisional Patent Application Ser. No. 60/270,011, filed Feb. 20, 2001, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, U.S. patent application Ser. No. 09/929,237, filed Aug. 13, 2001, U.S. Provisional Patent Application Ser. No. 60/225,094, filed Aug. 14, 2000 and U.S. patent application Ser. No. 09/929,234, filed Aug. 13, 2001, the disclosures of which are herein incorporated by reference.

In the exemplary implementation shown in FIG. 2, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism such as a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism such as a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately $1/32$-inch to $1/4$-inch from the edge of the blade by fusible member 70; however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, U.S. patent application Ser. No. 09/929,240, filed Aug. 13, 2001, U.S. Provisional Patent Application Ser. No. 60/225,170, filed Aug. 14, 2000, U.S. patent application Ser. No. 09/929,227, filed Aug. 13, 2001, U.S. Provisional Patent Application Ser. No. 60/225,169, filed Aug. 14, 2000, U.S. patent application Ser. No. 09/929,241, filed Aug. 13, 2001, the disclosures of which are herein incorporated by reference.

In the exemplary embodiment illustrated in FIG. 2, reaction subsystem 24 is configured to act on cutting tool 14 and stop the rotation of blade 40. As mentioned above, reaction subsystem 24 additionally or alternatively may be configured to act on a different portion of operative structure 12 to stop and/or reverse the translation of blade 40 toward the workpiece and the user's body. For example, it may be desirable to stop the downward movement of the pivot arm that supports the blade. Those of skill in the art will appreciate that when the rotation of blade 40 is stopped suddenly, the angular momentum of the blade may be transferred to pivot arm 98, causing the pivot arm to move downward toward base assembly 90 and the user. Thus, it may be desirable to stop the movement of the pivot arm at substantially the same time the movement of the blade is stopped. Alternatively, the movement of the pivot arm may be stopped without stopping the rotation of the blade. A variety of different safety systems configured to stop the downward movement of the pivot arm are described in U.S. Provisional Patent Application Ser. No. 60/270,942, filed Feb. 22, 2001, the disclosure of which is herein incorporated by reference.

In addition to stopping the movement of the pivot arm, it may also be desirable to quickly reverse the movement to retract the pivot arm upward away from the workpiece and the user's body. Alternatively, reaction subsystem 24 may be configured to retract a different portion of operative structure 12 instead of, or in addition to, the pivot arm. The reaction subsystem is configured to retract the pivot arm or other portion quickly enough to prevent serious injury to the user. Where the reaction subsystem is triggered in response to contact between the user's body and the blade, the reaction subsystem typically is configured to retract the pivot arm within approximately 10 milliseconds, more preferably within approximately 5 milliseconds, and most preferably within approximately 1–2 milliseconds. Alternatively, the reaction subsystem may be configured to retract the pivot arm or other portion of the operative structure less quickly in some applications. For example, where the reaction subsystem is triggered in response to contact between the user's body and a guard structure proximate the blade, it may be sufficient to retract the pivot arm within 25, 50 or 100 milliseconds, etc.

Safety system 18 may be configured in a variety of different ways to retract either a portion or all of operative structure 12. Several exemplary embodiments of such safety systems, adapted for use on various types of power cutting machines, are described in U.S. Provisional Patent Application Ser. No. 60/225,089, filed Aug. 14, 2000 and U.S. patent application Ser. No. 09/929,242, filed Aug. 13, 2001, the disclosures of which are herein incorporated by reference. Additionally, FIG. 3 illustrates an exemplary miter saw 10 having an alternative embodiment of safety system 18 configured to at least partially retract the pivot arm in the event of contact between the blade and the user's body.

Exemplary miter saw 10 includes a base assembly 90 adapted to support a workpiece (not shown) during cutting. Typically, one or more fences 92 are mounted on base assembly 90 and adapted to prevent the workpiece from shifting across the base assembly during cutting. Operative structure 12 is coupled to base assembly 90 and includes a platen 94, a tilt mechanism 96, and a pivot arm 98. Platen 94 is coupled to base assembly 90 and rotatable, relative to the base assembly, about the axis indicated at A. Tilt mechanism 96 is coupled to platen 94. At least a portion of the tilt mechanism is rotatable, relative to base assembly 90, about the axis indicated at B. Pivot arm 98 is coupled to tilt mechanism 96 and selectively pivotal toward and away from base assembly 90, as illustrated in FIG. 3. Typically, the pivot arm is biased upward away from base assembly 90 by a spring or other suitable mechanism.

Motor assembly 16 is mounted on pivot arm 98 and includes at least one motor 100 and a control handle 102. Blade 40 is coupled to an arbor shaft (not shown) that is rotatably driven by motor 100. Control handle 102 includes one or more controls (not shown) that are operable by a user to control motor 100. A user brings blade 40 into contact with a workpiece by grasping control handle 102 and pulling pivot arm 98 downward against the upward bias from a nominal position (indicated generally by dash lines in FIG. 3), toward base assembly 90. Once the cutting operation is completed, the user allows the pivot arm to pivot upward toward the nominal position.

Figure 3:
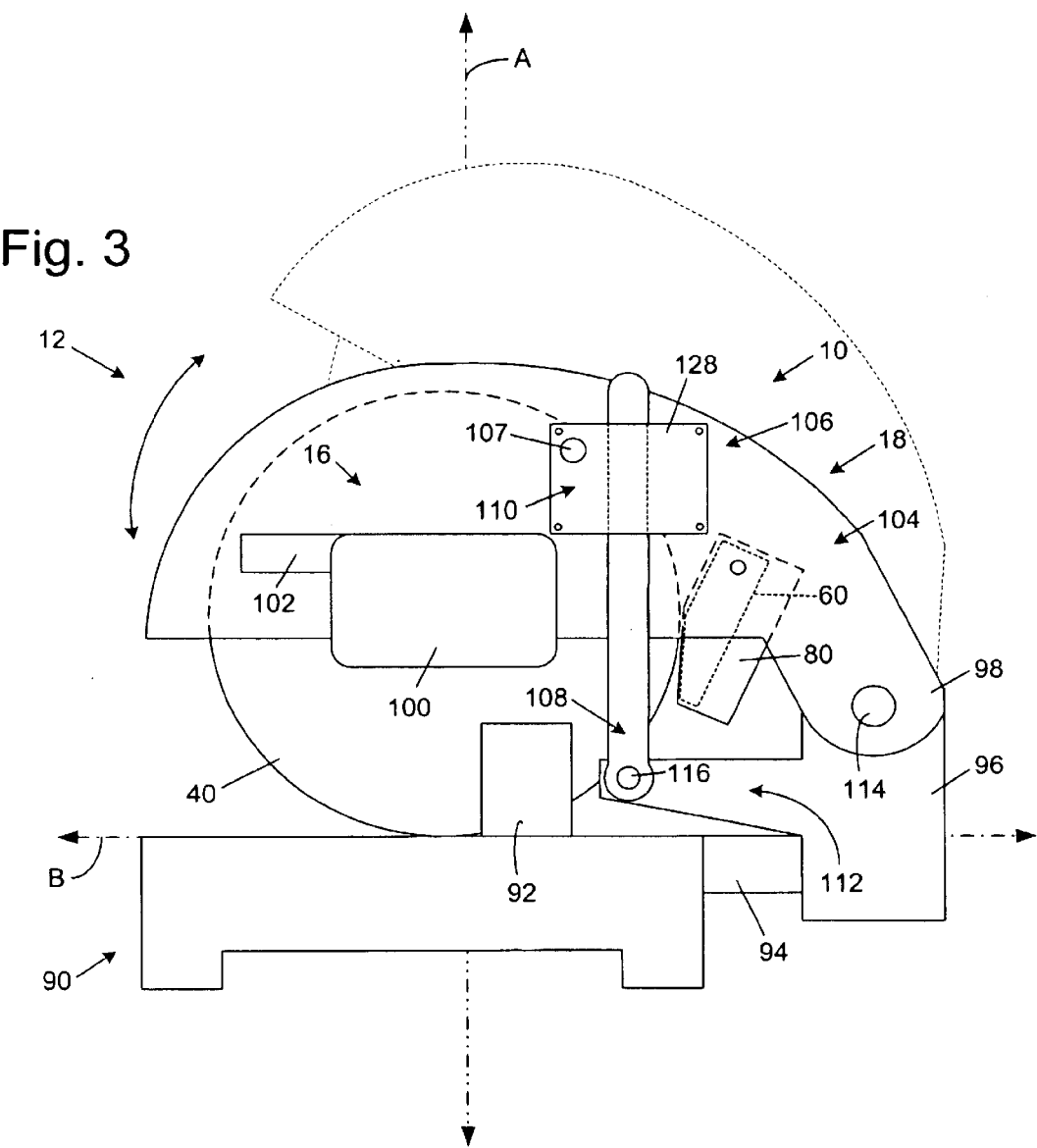
FIG. 3 is a schematic side elevation view of a miter saw having an alternative exemplary safety system configured to stop the miter saw pivot arm as well as the blade.

It will be appreciated by those of skill in the art that the miter saw configuration depicted in FIG. 3 and described above is one commonly referred to as a "compound miter saw," which allows a user to make a compound (i.e., both mitered and beveled) cut in a workpiece by adjusting the position of platen 94 and/or tilt mechanism 96. However, there are many other miter saw configurations known to those of skill in the art which are also suitable for use with the present invention. Thus, it will be understood that the particular miter saw configurations depicted and described herein are provided to illustrate exemplary embodiments of the invention, and should not be interpreted to limit the scope or application of the present invention.

Although not shown in FIG. 3, detection subsystem 22 and control subsystem 26 may be mounted at any desired location on miter saw 10 and configured to detect contact between blade 40 and a user's body as described above and in the references incorporated herein. Alternatively, the detection and control subsystems may be configured to detect contact between the user's body and some other portion of the miter saw such as a guard, etc. Upon receiving an activation signal, a first portion 104 of reaction subsystem 24 is configured to stop the rotation of blade 40, while a second portion 106 of the reaction subsystem is configured to move pivot arm 98 upward away from the base assembly. In the exemplary embodiment, first portion 104 includes a brake pawl 60 mounted in a cartridge 80, such as described above and in the incorporated references. Brake pawl 60 is selectively pivotal into blade 40 to stop the rotation of the blade. Alternatively, the first portion may employ other brake mechanisms such as described in the incorporated references. As a further alternative, first portion 104 may be omitted so that the rotation of blade 40 is not stopped in response to the occurrence of a dangerous condition.

In any event, second portion 106 retracts the pivot arm upward far enough to remove the blade from contact with the user's body. Preferably, the second portion is configured to move the pivot arm upward at least ⅛-inch, more preferably at least ¼-inch, and most preferably at least ½-inch or more. In embodiments where the reaction subsystem is configured to stop the rotation of blade 40, the second portion preferably retracts the pivot arm before or at the same time the blade is stopped. This prevents the pivot arm from moving downward as a result of angular momentum transferred to the pivot arm from the blade. The second portion of the reaction subsystem may be triggered prior to the first portion, or the second portion may be configured to engage the pivot arm more quickly than the brake pawl engages the blade.

Second portion 106 of exemplary reaction subsystem 24 includes a brace member 108 and a retraction assembly 110. Brace member 108 is pivotally coupled to tilt mechanism 96 at 105. Retraction assembly 110 is pivotally coupled to pivot arm 98 at 107 and configured to slidably receive at least a portion of brace member 108. The retraction assembly is configured to quickly grip or lock onto the brace member and urge the pivot arm upward upon receipt of an actuation signal from control subsystem 26. Once the retraction assembly has been triggered, pivot arm 98 is prevented from further downward movement toward base assembly 90. While second portion 106 is illustrated as having a single brace member and a single retraction assembly on one side of miter saw 10, it will be appreciated that the reaction subsystem may alternatively include a plurality of brace members and/or retraction assemblies positioned at selected locations on miter saw 10.

Brace member 108 may take any of a variety of different forms. In the exemplary embodiment, the brace member is an elongate bar or shaft pivotally coupled to tilt mechanism 96. Brace member 108 may be constructed of any suitably rigid material such as steel, aluminum, plastic, ceramic, etc. The pivotal coupling between the brace member and the tilt mechanism allows the brace member to pivot as necessary to follow the retraction assembly as the pivot arm moves toward and away from the base assembly. In the exemplary embodiment, the brace member is coupled to the tilt mechanism by a ball-joint-rod-end-bearing coupling 105, such as are available from a variety of sources including MSC Industrial Supply Company of Melville, N.Y. Alternatively, other types of couplings may be used, such as universal couplings, etc.

In the exemplary embodiment, brace member 108 is coupled to an arm portion 112 of tilt mechanism 96 that extends outward from the tilt mechanism toward the base assembly. While arm 112 is depicted as an integral, unitary portion of the tilt mechanism, the arm portion may alternatively take the form of a separate bracket attached to the tilt mechanism. Alternatively, the arm may be omitted and brace member 108 may be coupled to another portion of the tilt mechanism. As further alternatives, the brace member may be coupled to a different portion of miter saw 10 such as platen 94, fence 92, or base assembly 90, etc. Embodiments of miter saw 10 and safety system 18 in which a brace member is coupled to other portions of the miter saw are described in more detail in U.S. Provisional Patent Application Ser. No. 60/270,942, filed Feb. 22, 2001 which has been incorporated herein by reference. In any event, the brace member should be relatively rigidly supported to ensure that pivot arm 98 is moved upward when retraction assembly 110 is triggered.

Retraction assembly 110 may be coupled to pivot arm 98 in any of a variety of different places. Typically, the retraction assembly and pivot point 107 are disposed to position brace member 108 spaced apart from pivot point 114 of arm 98 to increase the moment of the upward force applied by reaction subsystem 24 to pivot arm 98. It will be appreciated that the further brace member 108 is positioned from pivot point 114, the greater the moment of force provided by the retraction assembly. Thus, it is generally desirable, though not necessary, to position the brace member as close to the front of miter saw 10 (i.e., the left side as shown in FIG. 3) as possible without interfering with the use of the miter saw. Similarly, the pivot point 105 of the brace member is disposed, relative to the retraction assembly, to orient the brace member generally perpendicular to the direction in which the pivot arm moves. This arrangement ensures that the downward force on the brace member is substantially a compression force rather than torque. Alternatively, retraction assembly 110 and pivot point 105 may be disposed at any selected positions suitable for stopping downward movement of pivot arm 98.

Since brace member 108 is coupled to tilt mechanism 96, the brace member will rotate along with pivot arm 98 about axis A when the miter saw is adjusted for mitered cuts. Similarly, the brace member will tilt about axis B when the miter saw is adjusted for beveled cuts. Thus, the exemplary configuration of reaction subsystem 24 depicted in FIG. 3 allows a user to adjust miter saw 10 throughout its full range of movement.

Optionally, reaction subsystem 24 may include one or more positioning mechanisms configured to remove any play or looseness in the couplings between brace member 108 and tilt mechanism 96, and/or the couplings between retraction assembly 110 and pivot arm 98. In situations where play or looseness may be present, the positioning mechanism ensures that the brace member and retraction assembly do not shift when the reaction subsystem is triggered. Examples of suitable positioning mechanisms are described in more detail in U.S. Provisional Patent Application Ser. No. 60/270,942, filed Feb. 22, 2001, which has been incorporated herein by reference. Alternatively, any other mechanism adapted to remove play from the reaction subsystem may be used.

Turning attention now to FIGS. 4–8, one exemplary embodiment of retraction assembly 110 is illustrated. Exemplary retraction assembly 110 is configured to grip and push downward on brace member 108 to move pivot arm 98 upward in response to an activation signal from control subsystem 26. Retraction assembly 110 includes a housing 118 configured to slidably receive brace member 108. Housing 118 includes a lower wall 120, and an upper wall 122 spaced apart from the lower wall. Housing 118 also includes a first end wall 124 and a second end wall 126 extending between opposite ends of lower wall 120 and upper wall 122. The lower, upper and end walls are connected together by any suitable mechanism such as bolts 127. A pair of side walls 128 (shown in FIG. 3) cover the sides of the lower, upper and end walls to enclose the housing.

Housing 118 is connected to the side of pivot arm 98 by a pivotal coupling 107 that allows the housing to move relative to the pivot arm as needed. Any of a variety of different couplings may be used which are known to those of skill in the art, such as a shoulder screw, etc. The pivotal coupling allows housing 118 to move as necessary to maintain a constant orientation or alignment with the brace member. In embodiments where the brace member is connected to a different structure on miter saw 10 such as platen 94 or fence 92, coupling 107 may be configured to allow the housing to both pivot parallel to the side of the pivot arm and tilt away from the pivot arm as needed.

As mentioned above, housing 118 is configured to slide along brace member 108. Lower wall portion 120 includes an orifice 130 configured to slide over the brace member. Similarly, upper wall portion 122 includes an orifice 132 configured to slide over the brace member. Orifices 130 and 132 are generally axially aligned and sized to closely fit around the brace member, thereby maintaining the housing in a uniform orientation relative to the brace member as pivot arm 98 is moved toward and away from the workpiece.

Figure 4:
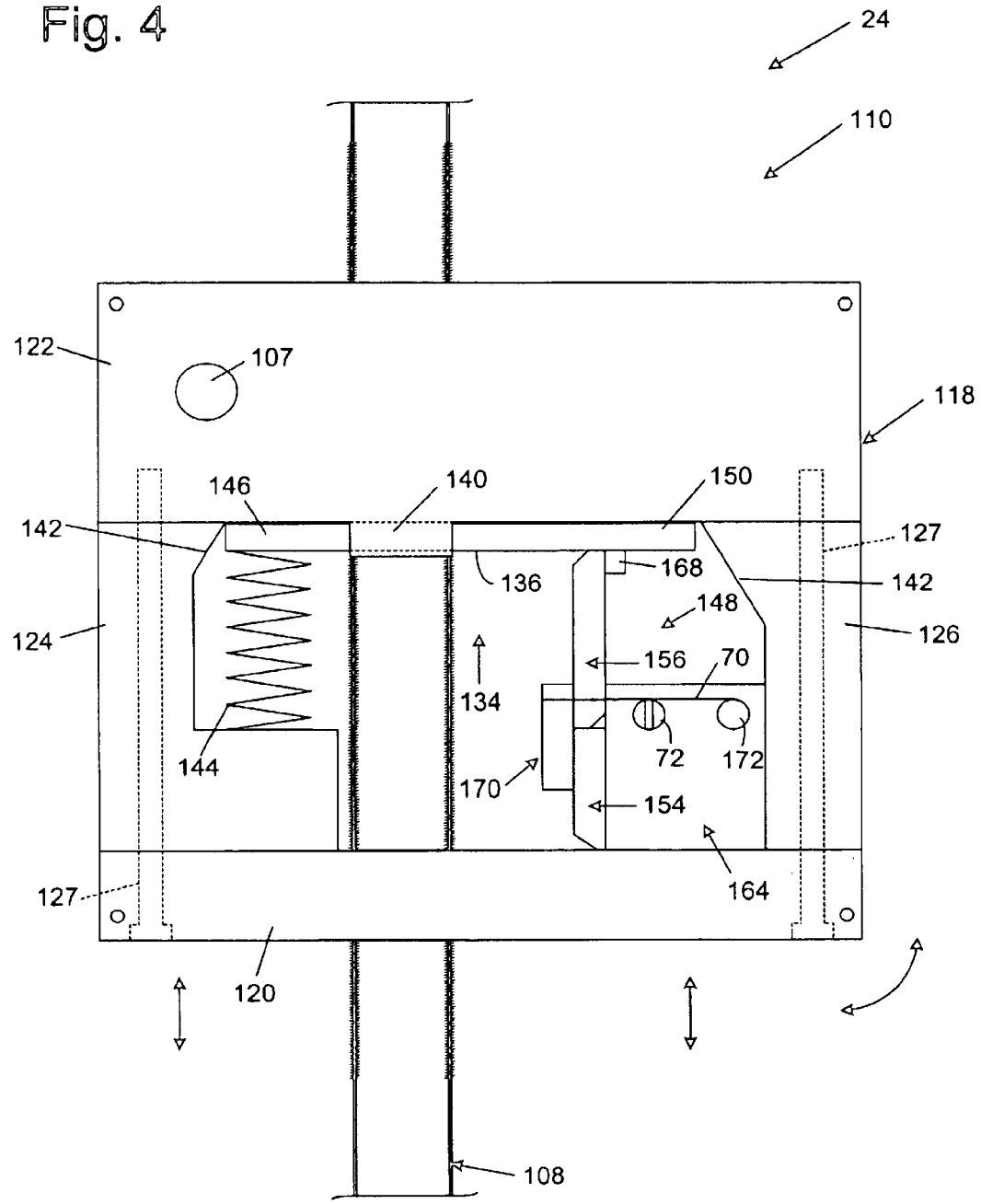
FIG. 4 is a magnified side view of an exemplary retraction assembly according to the present invention.
Figure 5:
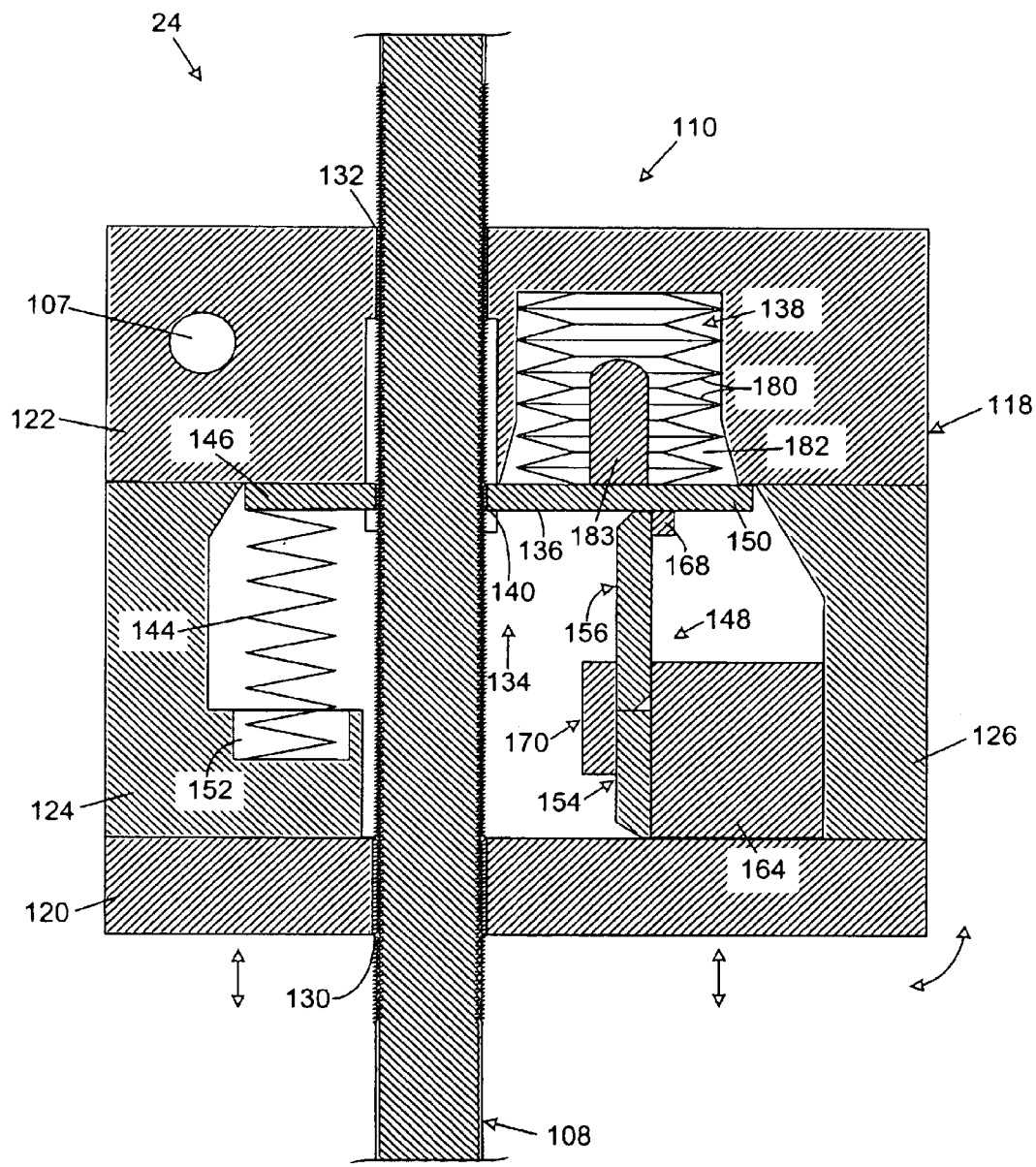
FIG. 5 is a magnified cross-sectional view of the retraction assembly of FIG. 4.
Figure 7:
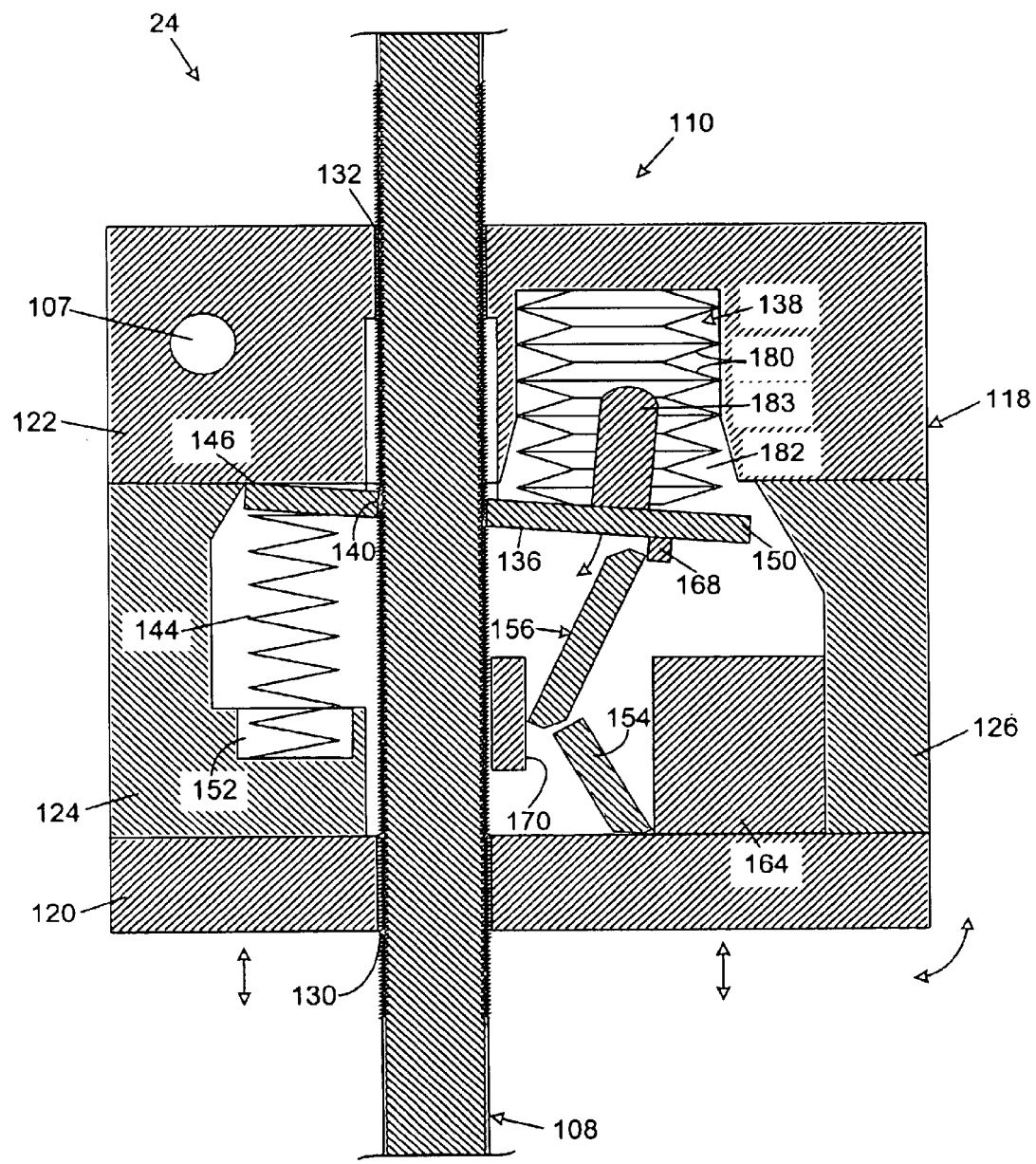
FIG. 7 is similar to FIG. 5 except that the clamping device is shown pivoted to the locked position.

Retraction assembly 110 also includes an actuator 134 configured to selectively grip brace member 108 and push the housing upward. Actuator 134 may be any one or a combination of elements, devices or mechanisms configured to quickly and securely grip the brace member. In the exemplary embodiment, actuator 134 includes a clamping device 136 adapted to selectively grip the brace member, and a drive mechanism 138 adapted to urge the housing upward relative to the clamping device. Clamping device 136 is formed to define an orifice 140 adapted to closely fit and slide along the brace member. The clamping device is pivotal between a nominal or unactuated position (as shown in FIGS. 4 and 5), and an actuated or locked position (as shown in FIG. 7). When the clamping device is in the nominal position, the sides of orifice 140 are substantially aligned with the sides of brace member 108 so that the clamping device slides relatively freely along the brace member. Conversely, when the clamping device is pivoted into the locked or actuated position, the sides of orifice 140 press into and bind against the brace member to releasably lock the clamping device onto the brace member. Drive mechanism 138 is disposed between the clamping device and upper wall 122 and configured to push the upper wall away from the clamping device when the clamping device is in the locked position. As a result, housing 118 and pivot arm 98 are pushed upward relative to the brace member and base assembly 90.

Clamping device 136 may be constructed of any suitable material adapted to grip the brace member and support the force exerted by drive mechanism 138. Typically, the clamping device is constructed of a material which does not cause damage to brace member 108 when the retraction assembly is triggered. For example, the clamping device and brace member may each be formed from a relatively rigid material such as hardened steel. Alternatively, the clamping device and/or brace member may be formed of any of a variety of other suitable materials known to those of skill in the art.

When in the nominal position, clamping device 136 is disposed adjacent the lower surface of upper wall 122 between end walls 124 and 126. The end walls are spaced to align the clamping device and orifice 140 end-to-end with the upper wall and orifice 132. Each end wall is inwardly tapered adjacent the upper wall so as not to obstruct the movement of the clamping device. Upper wall 122 includes a pair of alignment structures 142 adapted to align the clamping device and orifice 140 side-to-side with the upper wall and orifice 132. When clamping device 136 is in the nominal position, orifice 140 is generally axially aligned with orifice 132 and orifice 130 to slidably receive the brace member.

Clamping device 136 is held in the nominal position by a yieldable support element such as spring 144 that engages the clamping device adjacent a first end 146, as well as a releasable restraining mechanism 148 that engages the clamping device adjacent a second end 150. First end wall 124 includes a recessed region adapted to hold a portion of spring 144 and align the spring with the clamping device. Although spring 144 is depicted as a compression spring, it will be appreciated that spring 144 may be any type of spring or other mechanism adapted to yieldably hold first end 146 adjacent the lower surface of upper wall 122.

Restraining mechanism 148 may take any of a variety of different configurations adapted to releasably support second end 150 of the clamping device. In the exemplary embodiment, drive mechanism 138 (which will be discussed in more detail below) exerts a constant downward force on the clamping device adjacent second end 150. Restraining mechanism 148 is configured to support the clamping device against the force exerted by the drive mechanism. Typically, though not necessarily, the restraining mechanism is generally aligned with the drive mechanism to reduce any bending stress to the clamping device.

Figure 8:
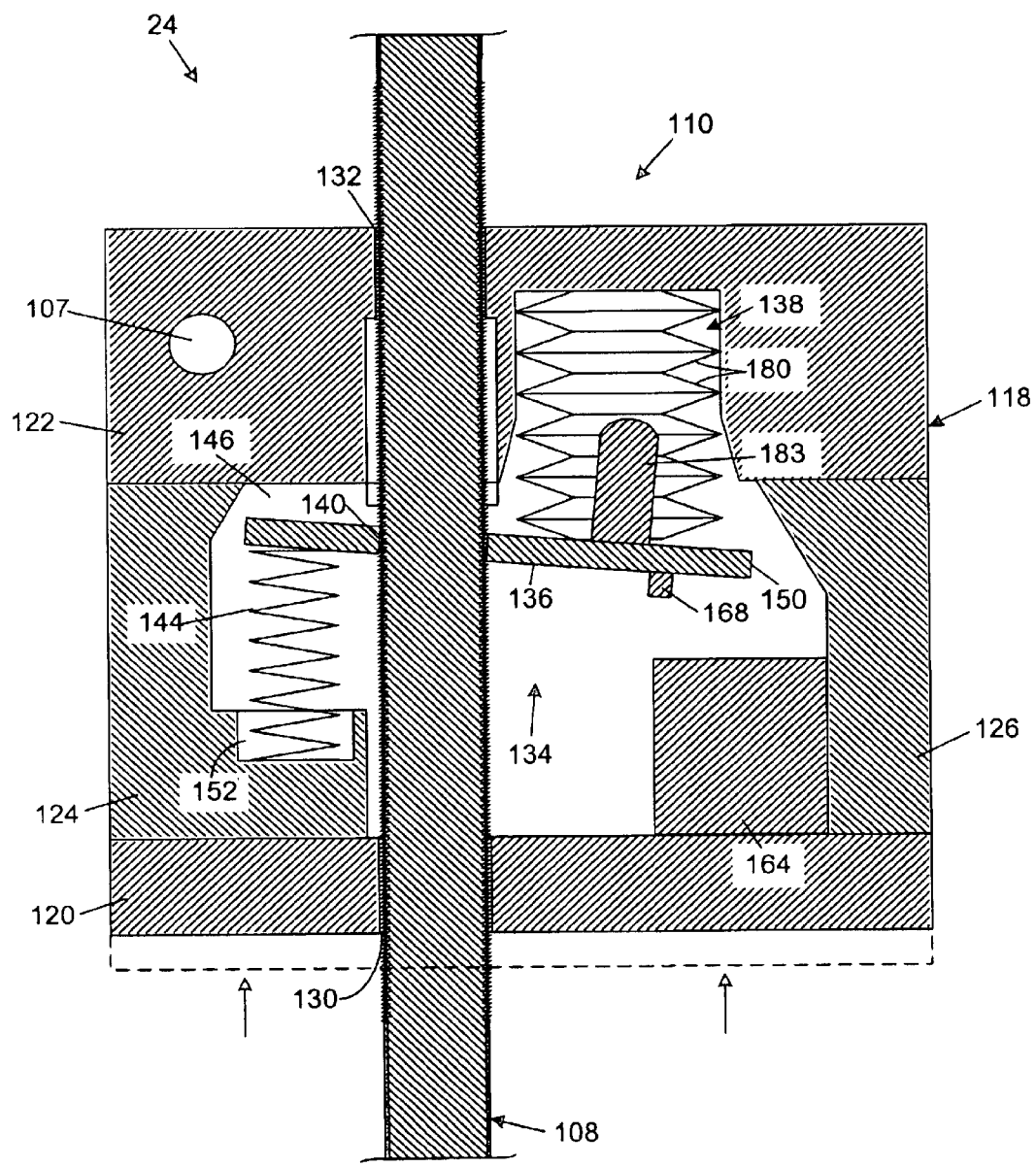
FIG. 8 is similar to FIG. 7 except that the housing is shown pushed upward relative to the brace member. For clarity, the components of the restraining member are not shown.

Exemplary restraining mechanism 148 is selectively collapsible to release the second end of the clamping device. The restraining mechanism includes an elongate collapsible base 154 adapted to support an elongate brace 156. In its uncollapsed state illustrated in FIGS. 4–6, a lower end 158 of base 154 rests on the upper surface of lower wall 120. The base extends upward from the lower wall toward the clamping device. A lower end 160 of brace 156 rests on an upper end 162 of base 154. The brace extends upward from the base to support the clamping device. When the base collapses, the brace is dislodged, thereby releasing the clamping device as shown in FIGS. 7–8.

When in the uncollapsed, upright position, one side of base 154 is disposed against a buttress structure 164. One side of lower end 160 of the brace is also disposed against the buttress structure, while an upper end 166 of the brace is disposed against a shoulder structure 168 on the clamping device. Shoulder structure 168 is configured to position the brace in upright alignment on top of the base. Base 154 and brace 156 are clamped against the buttress structure by a stabilizer member 170. The stabilizer member is held in clamping engagement with the base and the brace by a fusible member 70 such as described above and in the incorporated references. Fusible member 70 extends from the stabilizer member, over a contact mount 72 to an anchor point 172. Contact mount 72 is coupled to a firing subsystem (not shown) adapted to supply sufficient electrical current to melt the fusible member. In the exemplary embodiment, contact mount 72 is anchored to buttress structure 164, which is constructed of an electrically non-conducting material such as plastic, etc.

Figure 6:
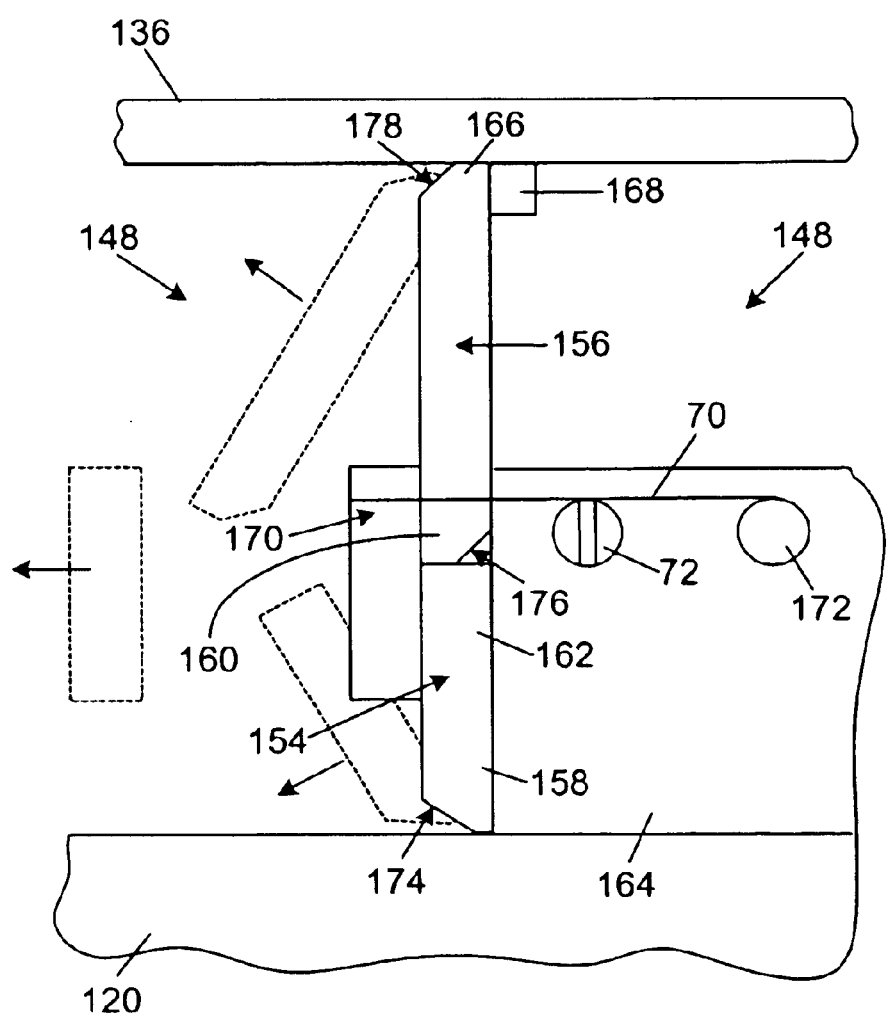
FIG. 6 is a magnified, fragmentary view of the retraction assembly of FIG. 4, showing the restraining mechanism in detail.

Lower end 158 of the base includes a beveled region 174 opposite the buttress structure. As shown in FIG. 6, beveled region 174 extends through more than half the thickness of the base. Lower end 160 of the brace includes a beveled region 176 adjacent the buttress structure. As a result, a portion of the downward pressure exerted on the clamping device by the drive mechanism is translated onto upper end 162 as a pivoting force away from the buttress structure. The remainder of the downward force is translated into a downward force on lower wall 128. The upper end of the base is prevented from pivoting outward so long as stabilizer structure 170 remains in place.

Those of skill in the art will appreciate that the particular configuration of restraining mechanism 148 described above provides a mechanical advantage for supporting second end 150 of the clamping device under the downward force of the drive mechanism. The proportion of downward force translated into pivoting force on the base will vary with the depth of beveled regions 174 and 176. Beveled regions 174 and 176 typically are configured so that much of the downward force applied by the drive mechanism is translated into downward force on base 154 rather than pivoting force. As a result, fusible member 70 is only required to support a portion of the force exerted by the drive mechanism. Indeed, several hundred pounds of downward force may be translated into only 10–20 pounds of outward pivoting force on stabilizer structure 170. This allows the fusible member to have a smaller diameter, thereby requiring less energy to melt. Nevertheless, the outward pivoting force should be sufficient to ensure the base collapses within 5–10 milliseconds, and preferably within 1–5 milliseconds.

In any event, when stabilizer member 170 is released, the upper end of base 154 quickly pivots outward from the buttress structure and collapses beneath the brace, as illustrated in FIGS. 6 and 7. Upper end 166 of the brace includes a beveled region 178 opposite shoulder structure 168 to allow the lower end of the brace to freely pivot outward from the buttress structure along with the base. Second end 150 of the clamping device is thereby released to move downward under the urging of the drive mechanism.

While second end 150 of the clamping device is pushed downward by the drive mechanism, first end 146 is pushed upward by spring 144. As a result, clamping device 136 pivots about brace member 108 into the locked position where the edges of orifice 140 bind against the sides of the brace member as shown in FIG. 7. The angle through which the clamping device must pivot before binding against the brace member will vary based at least partially on the size differential between orifice 140 and brace member 108. It is believed that the binding force generated by the clamping device against the brace member is increased where the pivot angle between the nominal position and the locked position is relatively small. Therefore, orifice 140 typically is sized to fit relatively closely around the brace member. For example, in an embodiment where brace member 108 takes the form of a rod having a circular cross-section with a diameter of approximately 0.375-inch, one suitable diameter for orifice 140 would be approximately 0.376-inch. Alternatively, other diameters may also be used within the scope of the invention. For clarity, the size difference between orifice 140 and brace member 108 is shown substantially exaggerated in FIGS. 5, 7 and 8.

As mentioned above, drive mechanism 138 is disposed between upper wall 122 and second end 150 of the clamping device. The drive mechanism is configured to urge the second end and upper wall apart when the clamping device is released from restraining mechanism 148. Once clamping device 136 pivots to the locked position, further downward movement of second end 150 is prevented because the clamping device is locked against the brace member. As a result, the additional drive force exerted by the drive mechanism forces upper wall 122 and housing 118 upward relative to the clamping device and brace member, as illustrated in FIG. 8. Since the housing is coupled to pivot arm 98, the pivot arm is forced upward as well.

Drive mechanism 138 should be configured to overcome the downward momentum of the pivot arm as well as any transferred angular momentum caused by stopping blade 40. In addition, the upward force exerted by the drive mechanism on the housing should be substantially larger than any downward force exerted by spring 144. Typically, the drive mechanism is configured to provide 100–500 pounds of upward force on the pivot arm. The length of upward travel of the pivot arm will depend on the length of translation, or 'throw,' of the drive mechanism as well as the distance second end 150 pivots downward before locking against the brace member.

In the exemplary embodiment, drive mechanism 138 includes a plurality of Belleville springs 180 stacked in series. The number of springs in the series is selected to provide a desired throw. Optionally, each spring in the series may alternatively be plural springs stacked in parallel to provide a desired amount of driving force. Springs 180 are disposed in a recessed region 182 of upper wall 122. The recessed region is sized to maintain the springs in general axial alignment. Additionally, clamping device 136 includes a spindle structure 183, adapted to fit within the central bores of at least a portion of the springs to maintain alignment between the springs. The spindle structure also serves to maintain alignment between the springs and the clamping device. It will be appreciated by those of skill in the art that drive mechanism 138 may alternatively take any of a variety of other configurations adapted to lock the clamping device against the brace member and force the pivot arm upward. For example, the drive mechanism may include a coil compression spring, explosive device, etc.

In any event, once the retraction assembly has been triggered, it may be uncoupled from the pivot arm and slid off the brace member. A new, untriggered retraction assembly may then be installed to place miter saw 10 and safety system 18 back in operation. Alternatively, the triggered retraction assembly may be reset using a new fusible member.

Figure 9:
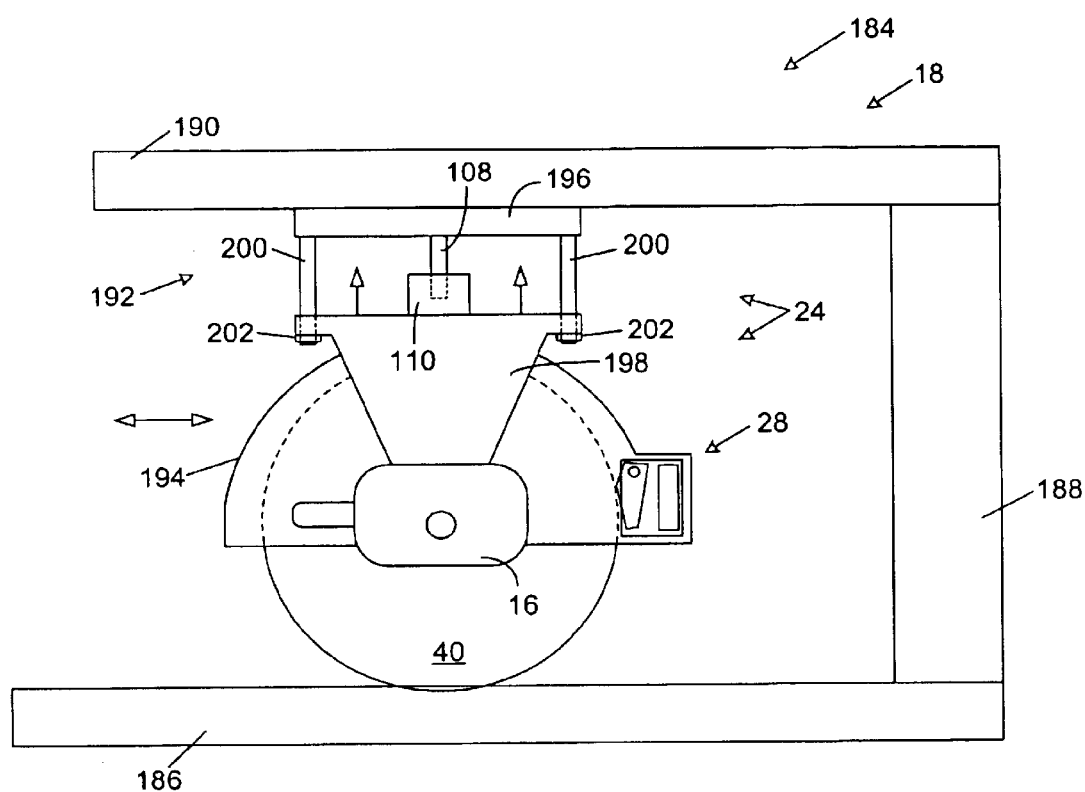
FIG. 9 is a schematic side elevation view of a radial arm saw having an alternative exemplary safety system configured to retract and stop the blade.

While one particular implementation of retraction assembly 110 has been described, it will be appreciated that numerous alterations and modifications are possible within the scope of the invention. Additionally, while the retraction assembly has been described in the context of retracting the pivot arm of a miter saw, it will be appreciated that the retraction assembly may also be adapted for use in other ways and on other machines. For example, FIG. 9 illustrates another embodiment of safety system 18 in the context of a radial arm saw 184. Typically, radial arm saw 184 includes a horizontal base 186, a vertical support column 188 extending upward from base 186, and a guide arm 190 which extends from column 188 vertically spaced above base 186. Carriage assembly 192 is slidably coupled to the underside of guide arm 190. Carriage assembly 192 is connected to a saw housing 194 and motor assembly 16, allowing blade 40 to be pulled across the base to cut workpieces (not shown) supported on the base.

Carriage assembly 192 includes an upper section 196 slidably coupled to guide arm 190, and a lower section 198 attached to housing 194 and/or motor assembly 16. Lower section 198 is coupled to slide vertically on a plurality (e.g., four) of shafts 200 that extend downward from upper section 196. Shafts 200 pass through holes in the lower section and are received into end caps 202 adapted to prevent the lower section from sliding off the shafts. During normal operation, the weight of housing 194, motor assembly 16, blade 40, etc., maintain the lower section of carriage assembly 192 resting on end caps 202 and spaced apart from the upper section.

Reaction subsystem 24 includes a brace member 108, such as described above, mounted on upper section 196 to extend downward toward lower section 198. The reaction subsystem also includes a retraction assembly 110, such as described above, mounted on lower section 198 to receive a portion of the brace member. Upon receiving an activation signal from control subsystem 26 (not shown), retraction assembly 110 is configured to quickly clamp onto brace member 108 and force lower section 198 upward. Thus, blade 40 is retracted upward upon the occurrence of a dangerous condition such as contact between the user's body and the blade.

Optionally, reaction subsystem 24 may also include a brake mechanism 28 configured to stop the rotation of the blade. In an alternative embodiment, retraction assembly 110 may be configured to reverse the forward and/or rearward translation of carriage assembly 192 along guide arm 190.

Figure 10:
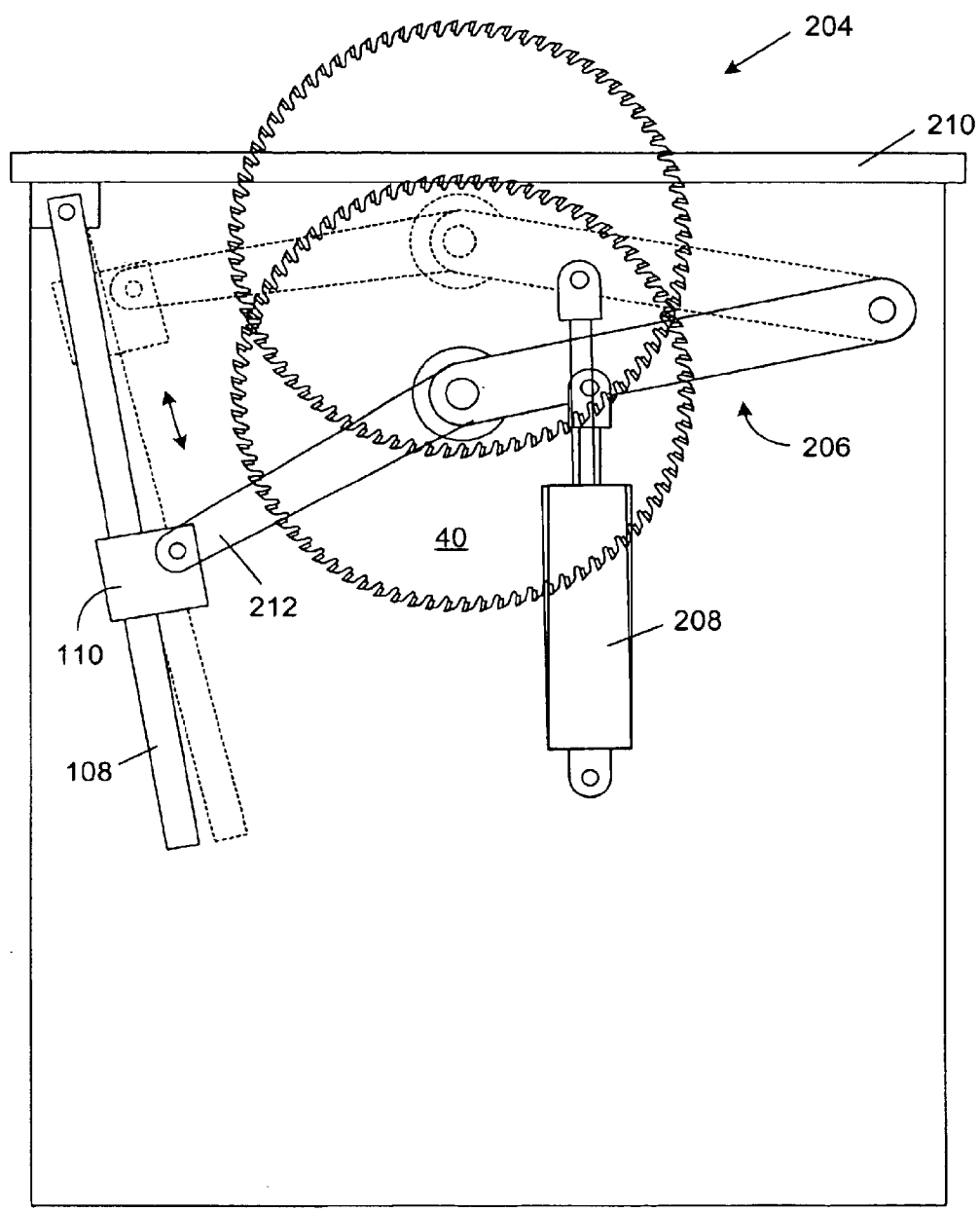
FIG. 10 is a schematic side elevation view of a pneumatic up-cut chop saw having an alternative exemplary safety system configured to retract the blade.

FIG. 10 illustrates another alternative configuration of safety system 18 for use on a pneumatic up-cut chop saw 204. Chop saw 204 includes a blade 40 mounted to a pivotal arbor block 206. Upon activation of a switch by the user, the arbor block is pivoted to the upward position shown in the dashed lines by a pneumatic cylinder 208. Blade 40 extends through a top plate 210 of the saw to cut a workpiece (not shown) resting on the top plate. Although not shown, chop saw 204 may include one or more vise/guards mounted on top plate 210 to hold down the workpiece. As described in more detail in U.S. Provisional Patent Application Ser. No. 60/233,459, filed Sep. 18, 2000 and U.S. patent application Ser. No. 09/955,418, filed Sep. 17, 2001, the disclosures of which are herein incorporated by reference, safety system 18 may be configured to trigger reaction subsystem 24 in response to contact between the user's body and one or more of the blade, the top plate, the vise/guard, etc.

As shown in FIG. 10, exemplary reaction subsystem 24 includes a brace member 108, such as described above, pivotally anchored to top plate 210 or some other suitable portion of the chop saw. The reaction subsystem also includes a retraction assembly 110, such as described above, adapted to receive and slide along the brace member. Retraction assembly 110 is coupled to arbor block 206 by a linkage 212.

During normal operation, the retraction assembly slides up and down the brace member as the pneumatic cylinder is actuated to raise and lower the blade. Upon receiving an activation signal from control subsystem 26 (not shown), the retraction assembly is configured to clamp onto the brace member and force arbor block 206 downward. Typically, safety system 18 will simultaneously reverse the pressure of the pneumatic cylinder. However, reversing the pressure of the pneumatic cylinder is usually too slow to prevent injury if the dangerous condition that was detected is contact between the user's body and the blade. Therefore, retraction assembly 110 typically is configured to exert sufficient downward force to overcome the upward force of the pneumatic cylinder. In addition, linkage 212 typically may be configured to ensure that the force exerted by the retraction assembly has a greater moment than the force exerted by the pneumatic cylinder. Alternative configurations of the pneumatic up-cut chop saw, including alternative linkages, are described in more detail in the incorporated references.

As described above, the present invention provides a miter saw which is substantially safer than existing saws. The miter saw includes a safety system 18 adapted to detect the occurrence of a dangerous condition and at least partially retract the pivot arm to prevent serious injury to a user. Those of skill in the art will appreciate that many modifications and variations to the exemplary embodiments are possible within the scope of the invention. Furthermore, the safety system may be adapted for use on a variety of other saws in addition to miter saws as has been described above. Additional modifications and variations, as well as such other saws are described in more detail in the following references, the disclosures of which are herein incorporated by reference: PCT Patent Application Ser. No. PCT/US00/26812, filed Sep. 29, 2000; U.S. Provisional Patent Application Ser. No. 60/225,212, filed Aug. 14, 2000; U.S. Provisional Patent Application Ser. No. 60/225,210, filed Aug. 14, 2000; U.S. Provisional Patent Application Ser. No. 60/225,201, filed Aug. 14, 2000; U.S. Provisional Patent Application Ser. No. 60/225,058, filed Aug. 14, 2000; U.S. Provisional Patent Application Ser. No. 60/225,057, filed Aug. 14, 2000; and U.S. Provisional Patent Application Ser. No. 60/157,340, filed Oct. 1, 1999.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A miter saw comprising:

a base assembly defining a cutting zone and configured to support workpieces in the cutting zone;

a pivot arm coupled to the base assembly and selectively moveable toward and away from the cutting zone;

a motor assembly;

a rotatable arbor supported by the pivot arm and driven by the motor assembly;

a rotatable blade mounted on the arbor and configured to cut workpieces supported within the cutting zone;

a detection system configured to detect one or more dangerous conditions between a person and the blade; and reaction means for urging the pivot arm away from the base assembly upon detection by the detection system of the one or more dangerous conditions;

where the reaction means includes a brace member and retraction means for gripping the brace member and for urging the pivot arm upward away from the base assembly when the detection system detects the one or more dangerous conditions between a person and the blade; where the brace member is coupled to the tilt mechanism and the retraction means; and where the retraction means is coupled to the pivot arm.

2. A miter saw comprising:

a base assembly defining a cutting zone and configured to support workpieces in the cutting zone;

a pivot arm coupled to the base assembly and selectively moveable toward and away from the cutting zone;

a tilt mechanism between the base assembly and the pivot arm, where the tilt mechanism is configured so that the pivot arm may tilt relative to the base assembly;

a motor assembly;

a rotatable arbor supported by the pivot arm and driven by the motor assembly;

a rotatable blade mounted on the arbor and configured to cut workpieces supported within the cutting zone;

a detection system configured to detect one or more dangerous conditions between a person and the blade; and a reaction system configured to urge the pivot arm away from the base assembly upon detection by the detection system of the one or more dangerous conditions;

where the reaction system comprises a brace member and a retraction assembly; where the brace member is coupled to the tilt mechanism and the retraction assembly; where the retraction assembly is coupled to the pivot arm; and where the retraction assembly is configured to grip the brace member and urge the pivot arm upward away from the base assembly when the detection system detects the one or more dangerous conditions between a person and the blade.

3. The miter saw of claim 2, where the brace member comprises a elongate shaft pivotally coupled to the tilt mechanism.

4. The miter saw of claim 3, where at least a portion of the shaft is serated.

5. The miter saw of claim 2, where the retraction assembly comprises:

a housing pivotally coupled to the pivot arm, where the housing is adapted to slidably receive the brace member;

a clamping device adapted to grip the brace member; and a drive mechanism adapted to urge the housing upward relative to the clamping device.

6. The miter saw of claim 5, where the drive mechanism is configured to provide an upward force relative to the base assembly in the range of 100 to 500 pounds.

7. The miter saw of claim 5, where the housing includes an upper wall and where the drive mechanism is disposed between the clamping device and the upper wall.

8. The miter saw of claim 5, where the drive mechanism includes at least one spring.

9. The miter saw of claim 8, where the at least one spring comprises a stack of Belville springs.

10. The miter saw of claim 5, where the clamping device includes an orifice through which the brace member extends.

11. The miter saw of claim 10, where the orifice has sides and where the sides of the orifice are adapted to press against the brace member to releasably lock the clamping device onto the brace member.

12. The miter saw of claim 5, further comprising a yieldable support device adapted to support the clamping device.

13. The miter saw of claim 12, where the yieldable support device is a spring.

14. The miter saw of claim 5, where the retraction assembly further comprises:

a restraining mechanism configured to maintain the clamping device in a nominal position until the detection system detects the one or more dangerous conditions.

15. The miter saw of claim 14, where the restraining mechanism comprises a collapsible structure.

16. The miter saw of claim 15, further comprising a fusible member adapted to prevent the collapsible structure from collapsing until the detection system detects the one or more dangerous conditions.

17. The miter saw of claim 14, where the restraining member includes a brace and a collapsible base.

18. The miter saw of claim 17, where the brace and collapsible base each have a lower end that includes a beveled region.

19. The miter saw of claim 17, where the restraining member further includes a buttress structure and a stabilizer member.

20. The miter saw of claim 19, further comprising a fusible member configured to hold the stabilizer member against the brace and collapsible base.

* * * * *